(No Model.)
C. JETSCHICK.
BICYCLE BELL.
No. 604,884.
Patented May 31, 1898.
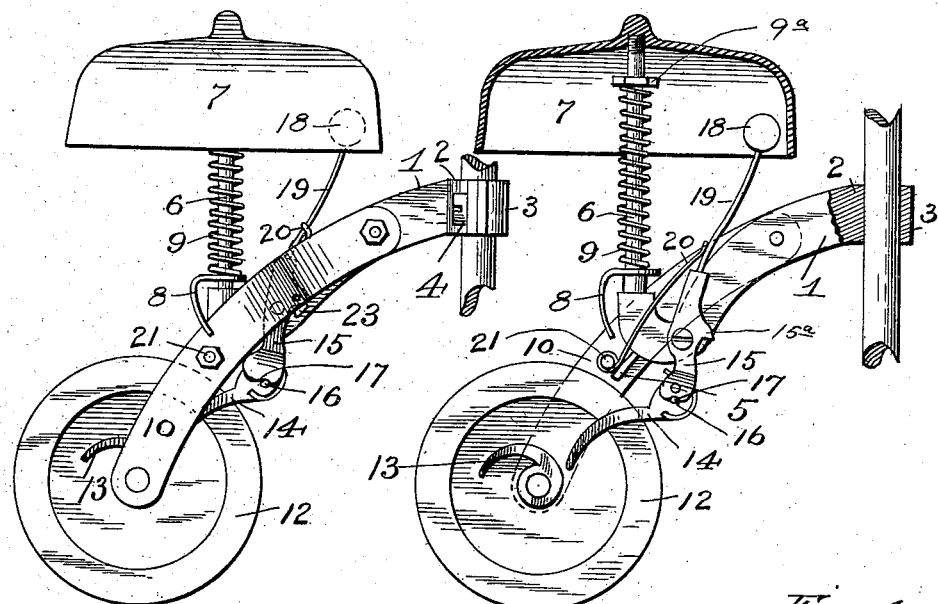
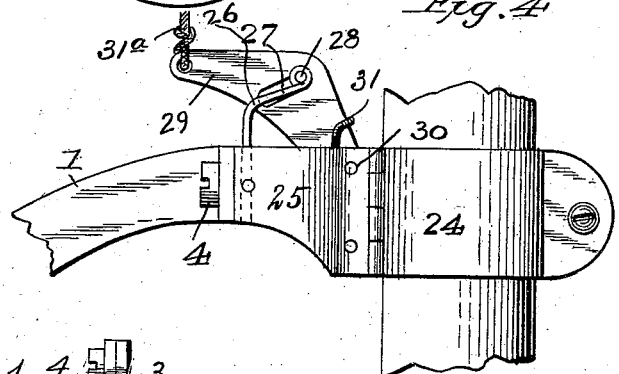
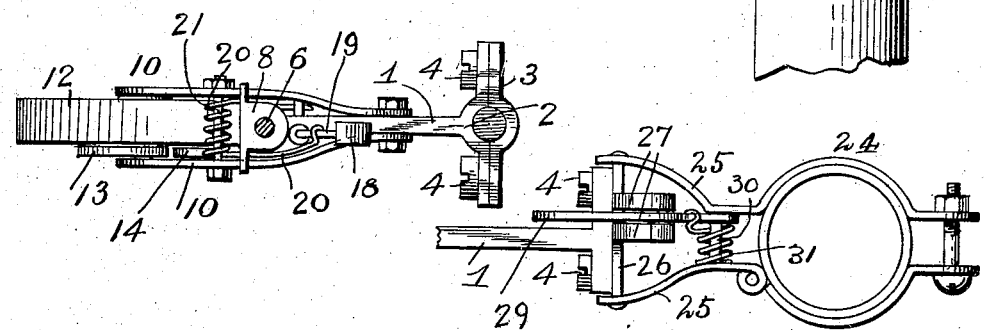
Witnesses:
Franck L. Ourand
Jos. L. Coombs
Inventor:
Christian Jetschick
by Louis Bagger & Co.
Attorneys.

UNITED STATES PATENT OFFICE.

CHRISTIAN JETSCHICK, OF SCRANTON, PENNSYLVANIA.

BICYCLE-BELL.

SPECIFICATION forming part of Letters Patent No. 604,884, dated May 31, 1898.

Application filed December 31, 1897. Serial No. 664,968. (No model.)

*To all whom it may concern:*

Be it known that I, CHRISTIAN JETSCHICK, a citizen of the United States, and a resident of Scranton, in the county of Lackawanna and State of Pennsylvania, have invented certain new and useful Improvements in Bicycle-Bells; and I do hereby declare that the following is a full, clear, and exact description of the invention, which will enable others skilled in the art to which it appertains to make and use the same, reference being had to the accompanying drawings, which form a part of this specification.

My invention relates to bicycle-bells adapted to be connected with the brake-rod of a bicycle and so constructed that as the brake-rod is depressed a small wheel provided with a cam is thrown into contact with one of the bicycle-wheels, so as to be rotated thereby and operate the bell-hammer through the medium of said cam.

The invention consists in the novel construction and combination of parts hereinafter fully described and claimed.

In the accompanying drawings, Figure 1 is a side elevation of a bicycle-bell constructed in accordance with my invention. Fig. 2 is a similar view showing one of the pivoted arms to which the operating-wheel is journaled removed. Fig. 3 is a plan view, the gong being removed. Fig. 4 is a side view showing a clamp adapted to be secured to the steering bar or head of a bicycle and to which the bell mechanism is secured. Fig. 5 is a plan view of the same.

In the said drawings the reference-numeral 1 designates a metal bar provided at one end with a head 2, which is clamped to the brake-rod of a bicycle by a plate 3 and bolts 4. The opposite end of this bar is formed with stop-pin 5 and is also provided with an upwardly-extending rod 6, carrying a gong 7 at the upper end. The rod passes through a bracket 8 and is provided with a coiled spring 9, the lower end of which bears thereupon, while the upper end bears against a collar 9$^a$, secured to rod 6. Pivoted to said bar 1 at opposite sides are forwardly-extending arms 10, to the free ends of which is journaled a wheel 12, provided at one side with a cam 13, with which is adapted to engage a trigger 14, pivoted to an arm 15, which in turn is pivoted to bar 1. This trigger is provided with a pin 16, adapted to engage with a notch 17 in the arm 15 to limit its downward movement.

The numeral 18 designates a hammer, and 19 a hammer-rod, connected with the arm 15. One end of a coiled spring 20, carried by a rod 21, connecting the arms 10, bears against said hammer-rod, so as to force it against the gong and sound an alarm when tripped.

The numeral 23 designates a projection on one of the arms 10, which when said arms are elevated by forcing the wheel 12 hard down upon the bicycle-wheel will engage with a lug 15$^a$ on the arm 15, so as to throw the trigger away from the cam 13, so that the latter will pass by the trigger without operating or tripping it. The object of this construction is to permit the bell to be sounded by a slight downward movement of the brake-rod, insufficient to throw the brake into engagement with the bicycle-wheel; but when the brake-rod is pushed hard down to set the brake the trigger will be thrown out of engagement with the cam.

The object of the spring 9 is to return the wheel to normal position after having been pressed hard down upon the bicycle-wheel.

In normal position the hammer 18 is a short distance away from the bell and when thrown backward and then released by the trigger will be carried forward by its own momentum, so as to strike the bell, and will be assisted in its rebound by the resistance of the arm 19.

To connect the device with the bicycle unprovided with a brake, I employ a clamp 24, which is secured to the head or steering-bar of the bicycle. This clamp is provided with lugs 25, to which is pivoted a plate 26, to which the head 2 of the bar 1 is pivoted. This plate is provided with a bifurcated arm 27, provided with a pin 28, which works in a slot in a lever 29, the lower end of which is pivoted to a pin 30, provided with a coiled spring 31, bearing upon the lever. The upper end of the lever is provided with a string 31$^a$, by pulling which the lever is operated, and through the medium of the slot and pin the plate 26 is turned on its pivots, so as to depress the bar 1 and throw the wheel 12 into contact with the bicycle and ring the bell.

The coiled spring 31 will restore the parts to normal position when the cord or string is released.

Having thus fully described my invention, what I claim is—

1. In a bicycle-bell, the combination with the bar, having a stop-pin at one end, the upwardly-extending rod, gong and coiled spring, of the wheel provided with a cam, the trigger, the pivoted arm to which the trigger is pivoted formed with a notch, the pin on the trigger, the spring bearing against said arm and the hammer-rod and hammer, substantially as described.

2. In a bicycle-bell, the combination with the bar adapted to be connected with a bicycle-brake, the upwardly-extending rod, the coiled spring, and the gong, of the arms pivoted to said bar, the connecting-rod, the coiled spring thereon, the bracket connected with said arms through which said rod passes, the wheel, the cam thereon, the arm pivoted to said bar and formed with a notch, the trigger pivoted thereto provided with a pin engaging with said notch, the projection on one of the side arms adapted to engage with said arm carrying the trigger, the hammer-rod and the hammer, substantially as described.

In testimony that I claim the foregoing as my own I have hereunto affixed my signature in presence of two witnesses.

CHRISTIAN JETSCHICK.

Witnesses:
JOHN GEORGE RAMMINGER,
ALBERT HAKEL.